Sept. 5, 1961         J. D. BARR ET AL         2,998,728
PICK-OFF DEVICES
Filed Feb. 3, 1958

INVENTORS
JOHN D. BARR
DOUGLAS M. SLOAN
BY
ATTORNEY

United States Patent Office 2,998,728
Patented Sept. 5, 1961

2,998,728
PICK-OFF DEVICES
John Denzil Barr, Warlingham, England, and Douglas McCutcheon Sloan, Montreal, Quebec, Canada, assignors to The Sperry Gyroscope Company Limited, Brentford, England, a company of Great Britain
Filed Feb. 3, 1958, Ser. No. 713,068
Claims priority, application Great Britain Feb. 7, 1957
5 Claims. (Cl. 74—5.6)

This invention relates to transformer type pick-offs of the kind described and claimed in the specification of U.S. patent application Serial No. 643,874 and now Patent No. 2,953,027 namely, pick-offs for detecting relative displacement between two relatively movable parts separated by an electrically conductive liquid comprising two members which can be secured to the relatively movable parts or otherwise arranged to be relatively moved in a manner corresponding to the relative movement of the parts, the two members being adapted to define with the liquid an electrically conductive path which varies in resistance according to the relative position of the members.

The present invention is particularly applicable to the purpose of measuring relative angular displacements between the rotor bearing case of a mercury floated gyroscope and an outer container enclosing the bearing case and containing the mercury. In the particular embodiment described in the specification of the identified application, variation in the resistance of the conducting paths was brought about by the closing of a surface of the bearing case towards an oppositely disposed surface of the container in one part of the gyroscopic instrument and the separation of two such surfaces in another part of the gyroscopic instrument. The design therefor involved the occurrence of bodily transport of mercury from one part of the instrument to another when relative displacement took place between the rotor case and the container.

According to the present invention, in a pick-off of the kind specified for detecting relative displacement between two closely spaced conforming surfaces respectively provided by the members, the core of a closed magnetic circuit is looped by a closed path of conductive liquid or mercury to provide a single turn winding whose resistance changes with the displacement to vary the reluctance of the circuit. The liquid providing the winding is located in a U-shaped passage in the container member of the instrument, in the gap between the relatively movable parts, and in a channel provided in an insulative insert in the case member of the instrument.

The closely space conforming surfaces of the respective gyroscopic members may be substantially spherical in form and the displacement detected by the pick-off may be a relative angular displacement about a point co-central with the spherical parallel surfaces.

Figure 1:
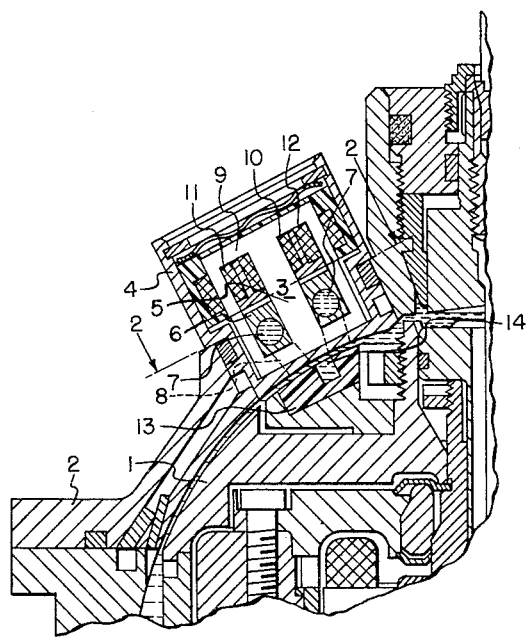
Figure 2:
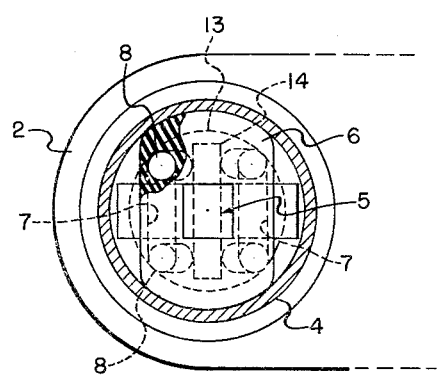

In order that the invention may be clearly understood and readily carried into effect, a pick-off embodying the invention, for a mercury-floated gyroscope, will now be described by way of example only, with reference to the accompanying drawing in which FIG. 1 is a sectional view of the improved pick-off and related gyroscopic parts, and FIG. 2 is a sectional view taken on line 2—2, in FIG. 1.

Referring now to the drawing the pick-off there shown is arranged to measure angular displacements in the plane of the drawing, between a generally spherical rotor bearing case 1 and an outer container 2, which encloses the bearing case in a generally spherical cavity filled with an electrically conductive liquid such as mercury. The closed container has an internal surface configuration that is symmetrical with respect to the rotor axis. The outer surface configuration of the case conforms to the surface of the container.

The rotor bearing case, with the gyroscope rotor and other parts it contains, has a mean density equal to that of the mercury so that it is buoyantly supported in neutral equilibrium by the weight of the mercury. Further, the bearing case is maintained with a gap of normally uniform width between the adjacent conforming surface configurations, and prevented from rotating relatively to the container about the rotor axis, by means of a flow of the mercury in the manner described in the specification of U.S. patent application Serial No. 710,820 and now Patent No. 2,913,907.

The main portion of the pick-off is mounted on the container and includes a core 3 with a center leg and two outside legs of magnetic material (ferroxcube). The core carries windings, and the core with its windings is housed in a pick-off housing 4 which is fitted into a hole in the mercury container with the back of an E-shaped half cores 5 directed towards the mercury in the container. The slots of the E-shaped half core 5 are filled with insulating material 6, but the insulating material in each of the slots is penetrated from end to end with a hole 7 which communicates at its two ends with passages 8 to communicate with the mercury in the container through orifices in the insulating material. Mercury fills the holes 7 and connecting passages 8 so that there is a U-shaped passage constituted by mercury looping each of the outer legs of half-core 5.

The other half 9 of the E-shaped core is wound with a primary winding 10 round the centre leg and with two output windings 11 and 12 wound one on one of the outer legs and the other on the other outer leg of the core. As shown, the half cores 5 and 9 are butted to connect the respective center and outer legs thereof to provide a pair of closed magnetic circuits. In operation, the primary winding 10 is energised with alternating current, for example, at 400 cycles per second, producing flux in the central leg of the core 3 which divides to return equally in the two outer legs. The output windings 11 and 12 on the outer legs have the same number of turns; they are connected in series opposition in an output circuit. If everything is symmetrical, equal and opposite E.M.F.'s are generated in the output windings, so that the resultant output E.M.F. from the pick-off device is zero.

The output of the pick-off can be varied from this zero value by varying the resistances of the two mercury turns so as to make these unequal. It is arranged that relative angular motion of the rotor bearing case 1 and the outer container 2 upsets the resistance balance between the resistances of the two mercury turns by increasing the resistance of one of the turns and decreasing that of the other. In consequence, the magnetic flux produced by the primary winding in the central leg of the core divides unequally between the two outer legs, passing predominantly through that outer leg which is looped by the mercury path of lower resistance. The result is that the winding on the more conductive leg produces a greater output E.M.F. than the winding on the less conductive leg.

In the outer surface of the rotor bearing case 1 there is formed a depression which is filled with an insert or button 13 of insulating material in the surface of which there is cut a channel 14. This channel runs parallel to the length of the holes 7 through the insulating material in the slots in the core and normally lies between the mouths of the pairs of passages 8. The liquid or mercury filled channel 14 acts as a low resistance connection between the terminal openings in the container of the U-shaped passages and as it moves more nearly into register with the mouths of one pair of passages and less nearly into register with the mouths of the other pair, the resistances of the turns are varied differentially. It is arranged that the channel 14 has such a width that, when it lies centrally opposite the central leg of the core, its edges extend close to positions opposite the mouths of the passages but not far enough to overlap these positions. In consequence, a very small displacement of the channel in either direction will increase the resistance of one of the loop turn paths and decrease the resistance of the other path. The single turn liquid windings provided for the core also include the liquid in the gap area of the pick-off between the respective container and case members of the instrument.

In order to ensure the production of an output signal which depends on angular displacement only, and not on any bodily displacement which may occur between the rotor bearing case 1 and the container 2, a second pick-off device, not shown, similar to that described and illustrated, and matched thereto, may be arranged in a position diametrically opposite the other, the two outputs from the paired pick-offs being added together to constitute a resultant pick-off signal dependent on angular displacement. The two primary windings may be connected in series so that they shall be energised by the same primary current.

It should be noted that the pick-off device is arranged so that movement of the rotor bearing case 1 relative to the mercury container about an axis perpendicular to the plane of the paper on which the drawing is printed, causes the channel 14 to move at right angles to or normal its length relatively to the pick-off core, and thus to vary the output from the pick-off, whereas motion about the axis perpendicular to the rotor axis and lying in the plane of the paper causes a movement of the channel 14 relative to the pick-off core that is substantially a movement along the length of this channel. The channel 14 is made longer than the spacing in the same direction between the openings in the surface of the container that it bridges; in consequence, movement of the channel along its length does not vary the resistance of either of the two mercury-loop providing turns.

The embodiment described may be modified in various ways without departing from the invention. For example, instead of the two mercury turns sharing a common channel associated with the rotor bearing case, two such channels may be provided. Again, the pick-off device could have a single liquid-loop turn linking a single transformer core providing as its output a single output E.M.F., which therefore would vary in amplitude only and not in phase sense, in dependence on the relative displacement of the two members. This output E.M.F. could be balanced against a fixed E.M.F. produced otherwise than by another pick-off device, and the differential output developed in the circuit would then be one that varied in amplitude and phase sense with relative displacement of the two members from a normal condition at which the differential output would be zero.

It will be observed that pick-off devices embodying the invention operate without requiring a displacement of liquid from one part to another, other than displacement of the liquid in the channel 14 which is formed in one of the movable members.

What is claimed is:

1. In a transformer type pick-off for a gyroscopic instrument having a closed container with a symmetrical internal surface configuration, a rotor case having an outer surface configuration substantially conforming to the internal surface configuration of the container, and an electrically conductive liquid filling the container and buoyantly supporting the case within the container with freedom about an axis with a gap of normally uniform width between the adjacent conforming surface configurations of the case and container; a wound magnetic core fixed to the container providing a closed magnetic circuit, a liquid filled U-shaped passage in said container looping the core and having spaced terminal openings at the internal surface configuration of the container, an insulative insert in the case with an outer surface configuration conforming to the surface of the case having a channel therein filled with the conducting liquid, said core and insert being so arranged that the liquid in the container passage, the gap, and the channel in the case completes a single turn winding whose resistance changes with relative displacement of the case and container from a normal condition about the axis in a direction normal to the channel to vary the reluctance of the magnetic circuit.

2. A pick-off of the character claimed in claim 1, in which the length of the channel in the insert is greater than the spacing between the terminal openings in the liquid filled passage in the container.

3. A transformer type pick-off for a gyroscopic instrument having a closed container with a symmetrical internal surface configuration, a rotor case having an outer surface configuration substantially conforming to the internal surface configuration of the container, and an electrically conductive liquid filling the container and buoyantly supporting the case within the container with freedom about an axis with a gap of normally uniform width between the adjacent conforming surface configurations of the case and container; a magnetic core fixed to the container having a wound center leg and two outer legs coupled to the center leg providing a pair of closed magnetic circuits, a first liquid filled U-shaped passage in said container looping ine of the outer core legs and having spaced terminal openings at the internal surface configuration of the container, a second liquid filled U-shaped passage in said container looping the other of the outer core legs and having spaced terminal openings at the internal surface configuration of the container, an insulative insert in the case with an outer surface configuration conforming to the surface of the case having a channel therein filled with the conducting liquid, said core and insert being so arranged that the liquid in the container passages, the gap, and the channel in the case completes a pair of single turn windings whose resistances change differentially with relative displacement of the case and container from a normal condition about the axis in a direction normal to the channel to vary the reluctances of the magnetic circuits.

4. A pick-off of the character claimed in claim 3, in which the terimnal openings between the respective liquid filled passages in the container have the same spacing, and the length of the channel in the insert is greater than the spacing between the respective connected terminal openings.

5. A pick-off of the character claimed in claim 3, in which the spacing between the respective pairs of connected terminal openings in the container is of uniform width corresponding to the width of the channel in the insert in the case.

References Cited in the file of this patent
UNITED STATES PATENTS

| 1,972,882 | Gillmor | Sept. 11, 1934 |
| 2,709,921 | Sylvan | June 7, 1955 |